United States Patent [19]

Kaneko

[11] Patent Number: 4,700,611

[45] Date of Patent: Oct. 20, 1987

[54] PNEUMATIC CYLINDER MOTOR WITH END-OF-TRAVEL CUSHIONING MECHANISM

[75] Inventor: Junya Kaneko, Sohka, Japan

[73] Assignee: Shoketsu Kinzoku Kogyo Kabushiki Kaisha, Tokyo, Japan

[21] Appl. No.: 650,059

[22] Filed: Sep. 13, 1984

[30] Foreign Application Priority Data

Sep. 17, 1983 [JP] Japan .......................... 58-144133[U]

[51] Int. Cl.$^4$ ........................ F15B 15/22; F15B 11/00; F01B 11/02; F16F 9/48

[52] U.S. Cl. ........................................ 91/405; 91/443; 91/471; 91/519; 92/11; 92/85 B; 188/284; 188/286

[58] Field of Search ...................... 91/170 R, 394, 401, 91/405, 443, 471, 519; 92/10, 11, 12, 85 B, 143; 188/284, 285, 286

[56] References Cited

U.S. PATENT DOCUMENTS

| | | | |
|---|---|---|---|
| 2,430,597 | 11/1947 | Acton | 91/170 R X |
| 3,476,014 | 11/1969 | Churchill et al. | 91/401 X |
| 4,195,552 | 4/1980 | Neff | 91/443 |
| 4,208,879 | 6/1980 | Segawa | 92/85 B X |
| 4,210,064 | 7/1980 | Beerens | 91/394 |
| 4,216,700 | 8/1980 | Iida | 91/170 R |
| 4,240,620 | 12/1980 | Tunkers | 91/401 X |
| 4,241,632 | 12/1980 | Seo | 91/170 R X |
| 4,262,695 | 4/1981 | Iizumi | 91/443 X |
| 4,455,923 | 6/1984 | Muller | 91/394 |
| 4,500,075 | 2/1985 | Tsuchiya et al. | 188/286 X |

FOREIGN PATENT DOCUMENTS

| | | | |
|---|---|---|---|
| 655606 | 9/1931 | Fed. Rep. of Germany | 91/170 R |
| 1036801 | 8/1958 | Fed. Rep. of Germany | 91/443 |
| 1239948 | 5/1967 | Fed. Rep. of Germany | 91/405 |
| 1016986 | 1/1966 | United Kingdom | 92/85 B |
| 973960 | 11/1982 | U.S.S.R. | 91/394 |

OTHER PUBLICATIONS

Yeaple, F. D. *Hydraulic and Pneumatic Power and Control*, McGraw Hill Book Co.; New York, N.Y. 1966, pp. 263–270, 272–273.

*Primary Examiner*—Robert E. Garrett
*Assistant Examiner*—George Kapsalas
*Attorney, Agent, or Firm*—Burns, Doane, Swecker & Mathis

[57] ABSTRACT

A cushioning mechanism in a pneumatic cylinder utilizing a supplied air pressure, and a method of cushioning a piston in the pneumatic cylinder. Cushioning chambers are provided at opposite ends of a cylinder body of the pneumatic cylinder. Respective differential pressure valves and relief valves are provided between each of the cushioning chambers and an air supply. A cushioning member is disposed between each cushioning chamber and a cylinder bore. Air supplied under pressure from the air supply is stored in one of the cushioning chambers. When the piston is displaced to push the cushioning member, the air in the cushioning chamber is compressed to cushion the piston. As the cushioning member is moved a prescribed interval, the cushioning chamber is vented to atmosphere.

9 Claims, 13 Drawing Figures

(A) LOW PISTON SPEED (B) HIGH PISTON SPEED

PNEUMATIC CYLINDER MOTOR WITH END-OF-TRAVEL CUSHIONING MECHANISM

BACKGROUND OF THE INVENTION

1. Field of the Invention

The present invention relates to a pneumatic cylinder having a cushioning mechanism and a method of cushioning the pneumatic cylinder, and more particularly to a pneumatic cylinder having a cushioning mechanism, with cushioning chambers defined at opposite ends of the pneumatic cylinder, wherein air supplied under pressure to move a piston in one direction is branched, introduced, and stored under pressure in one of the cushioning chambers at a time, and when the piston is moved in an opposite direction, the stored air under pressure is utilized to dampen the movement of the piston, and also to a method of cushioning the piston in the pneumatic cylinder.

2. Description of the Prior Art

Many pneumatic cylinders have a cushioning mechanism to provide against a load having large inertial energy for dampening an inertial force to reduce any undesired shock when the piston reaches a stroke end.

FIG. 1 of the accompanying drawings illustrates a conventional cushioning mechanism in a pneumatic cylinder. The pneumatic cylinder, designated at 2, has a head cover 4 with an inlet/outlet port 6 defined therein. The head cover 4 also has an inner cavity 8 with a cushioning packing 10 fitted in an end thereof. An adjustable needle point valve 12 is disposed in the head cover 4 in diametrically opposite relation to the inlet/-outlet port 6, and has a needle point positioned in a bent passage 14 extending from a bore in the cylinder 2 to the cavity 8.

A piston rod 16 is axially movably disposed in the cylinder 2 and supports on an end portion thereof a piston 18 slidably mounted in the cylinder 2. The piston 18 and the cavity 8 jointly define a cushioning chamber 24 therebetween. A seal ring 20 is fitted in and extends along an annular groove defined in a central peripheral surface of the piston 18. A cushioning ring 22 is mounted on the end of the piston rod 16.

When the piston rod 16 is axially moved in the direction of the arrow A to a broken-line position, air flowing from the cushioning chamber 24 is restricted by the needle point valve 12 to reduce the speed of travel of the piston 18 at a stroke end thereof. More specifically, the distal end of the cushioning ring 22 is brought into contact with the cushioning packing 10, and the fluid under pressure from the cushioning chamber 24 is restricted by the passage 14 and the needle point located therein. As a result, the pressure in the cushioning chamber 24 is increased as the piston 18 is moved, thereby providing a cushioning action. The cushioning force available can be adjusted in magnitude by adjusting the needle point valve 14 to vary the cross-sectional area of the passage 14.

However, the cushioning mechanism of the foregoing construction has the following problems: As illustrated in FIG. 2, the speed of operation of a pneumatic cylinder is generally determined by the difference between a driving force F which displaces the piston itself and a braking force S tending to limit the movement of the piston. In a meter-out system, it is customary to regulate the damping force by keeping the driving force F substantially constant while changing the braking force S. Therefore, where the piston reciprocates at a higher speed, air has to be discharged under a lower pressure. More specifically, since the conventional cushioning mechanism dampens the reciprocating movement of the piston by using the discharged air pressure which produces the braking force S, the pressure of air entrapped in the cushioning chamber 24 becomes progressively lower as the speed of the reciprocating movement of the piston 18 goes higher, with the consequence that the ability to absorb or dampen the kinetic energy produced by the reciprocating movement of the piston 18 is reduced, or a desired damping capability is not available.

FIGS. 3(A) and 3(B) illustrate the correlations between the piston stroke and the air pressure, plotted when the piston reciprocates at lower and higher speeds. As the air pressure supplied to the cylinder 2 is progressively increased, the piston 18 is axially displaced and the pressure of air discharged out of the inlet/outlet port 6 is progressively reduced. When the cushioning ring 22 is moved into contact with the cushioning packing 10, compressed air from the cushioning chamber 24 flows through the passage 14 into the cavity 8 from which air is discharged out of the inlet/outlet port 6. The rate at which the pressure of entrapped air is reduced is not greatly reduced from the time the cushioning ring 22 contacts the cushioning packing 10 on. At a lower speed of reciprocating movement of the piston 18 as shown in FIG. 3(A), as the piston stroke increases further, the cushioining pressure is quickly built up as indicated by the hatched area. Accordingly, the pneumatic cylinder achieves a sufficient dampening capability.

When the speed of reciprocating movement of the piston 18 is increased as shown in FIG. 3(B), the pressure of discharge air is abruptly reduced as compared with the supplied air pressure. The pressure of air entrapped in the cushioning chamber 24 is quite low at the time when the cushioning ring 22 contacts the cushioning packing 10. Therefore, the cushioning pressure is much smaller as compared with the cushioning pressure shown in FIG. 3(A), failing to provide a desired dampening capability. The lack of enough dampening forces would allow the piston to be forced against the head cover under a large inertial force, resulting in damage to the head cover or other unwanted accidents. Desigated in FIGS. 3(A) and 3(B) at $\Delta P$ is the difference between the supplied air pressure and the discharged air pressure at the end of the piston stroke.

SUMMARY OF THE INVENTION

With the foregoing conventional drawbacks in view, it is an object of the present invention to provide a pneumatic cylinder having a cushioning mechanism, with cushioning chambers defined at opposite ends of the pneumatic cylinder, wherein a fluid supplied to move a piston is introduced into the cushioning chambers for reliably and quickly dampening the piston which reciprocably moves at high speeds, thereby shortening the time required to actuate the cylinder and achieving a high-speed mode of operation of the cylinder, and wherein the piston will not strike a head cover and a rod cover with an impact to thereby avoid undesired damages or accidents, and also to provide a method of cushioning the piston in the pneumatic cylinder.

According to the present invention, there is provided a pneumatic cylinder with a cushioning mechanism, comprising: a cylinder body having a first cushioning chamber at one end thereof and a second cushioning chamber at an opposite end thereof, the cylinder body having first and second inlet/outlet ports at the ends thereof, respectively, the first inlet/outlet port and the first cushioning chamber communicating with each other through a first air passage, the second inlet/outlet port and the second cushioning chamber communicating with each other through a second air passage; a piston slidably movable in the cylinder body; a first cushioning member displaceably mounted in the first cushioning chamber and extending toward the piston for being pushed thereby; a second cushioning member displaceably mounted in the second cushioning chamber and extending toward the piston for being pushed thereby; an air supply connected to the first and second inlet/outlet ports through a common directional control valve; a first valve body disposed in the first air passage for adjusting an air pressure from the air supply and supplying the adjusted air pressure into the first cushioning chamber to displace the first cushioning member; a second valve body disposed in the second air passage for discharging compressed air from the first cushioning chamber to the first inlet/outlet port when the pressure of air compressed in the first cushioning chamber by the first cushioning member displaced by being pushed by the piston exceeds a predetermined level; a third valve body disposed in the second air passage for adjusting an air pressure from the air supply and supplying the adjusted air pressure into the second cushioning chamber to displace the second cushioning member; and a fourth valve body disposed in the second air passage for discharging compressed air from the second cushioning chamber to the second inlet/outlet port when the pressure of air compressed in the second cushioning chamber by the second cushioning member displaced by being pushed by the piston exceeds a predetermined level.

The pneumatic cylinder also includes a piston rod having an end attached to the piston, the first cushioning member comprising a shaft for engaging one end face of the piston and a disk movable in unison with the shaft within the first cushioning chamber, the first cushioning member being normally pressed toward the piston by a pressing member disposed in the first cushioning chamber, the second cushioning member comprising a cylindrical body for engaging an opposite end face of the piston with the piston rod extending through the cylindrical body and a disk movable in unison with the cylindrical body within the second cushioning chamber, the second cushioning member being normally pressed toward the piston by a pressing member disposed in the second cushioning chamber.

The pneumatic cylinder also includes a head cover mounted on the one end of the cylinder body, a first wall disposed in the cylinder body and having an end directed toward the head cover, the first cushioning chamber being defined by the head cover, the first wall, and the end of the first wall, a rod cover mounted on the opposite end of the cylinder body, and a second wall disposed in the cylinder body and having an end directed toward the rod cover, the second cushioning member being defined by the rod cover, the second wall, and the end of the second wall.

The pressing members for pressing the first and second cushioning members comprise coil springs, respectively.

The first and third valve bodies comprise controllable-pressure differential pressure valves, respectively, the second and fourth valve bodies comprise controllable-pressure relief valves, respectivley.

The first and third valve bodies comprise check valves, respectively.

The second and fourth valve bodies comprise restrictor valves, respectively.

The first and second cushioning members include disks, respectively, dividing the first and second cushioning chambers substantially into two chambers, each of the disks having a passage providing communication between the two chambers.

One of the two chambers divided in each of the first and second chambers has a passage vented to atmosphere.

The pneumatic cylinder further includes resilient rings mounted respectively on the disks, the resilient rings blocking communication between the passage communicating between the two chambers and the passage vented to atmosphere when the first and second cushioning members are displaced toward the piston.

According to the present invention, there is also provided a method of cushioning a pneumatic cylinder having a cylinder body with a piston slidably disposed therein and a piston rod attached thereto, the cylinder body having a cushioning chamber with a cushioning member displaceably mounted therein and engageable with the piston, and a valve body communicating with the cushioning chamber, the comprising the steps of: supplying air under pressure from an air supply into the pneumatic cylinder to move the piston and the piston rod reciprocally; introducing an air flow branched from the supplied air into the cushioning chamber and simultaneously displacing the cushioning member; bringing the piston into pushing engagement with the cushioning member in response to reciprocating movement of the piston and the piston rod to compress air stored in the cushioning chamber; and discharging the compressed air from the cushioning chamber through the valve body out of the cylinder body for thereby cushioning the piston.

The supplied air flow introduced into the cushioning chamber is adjusted in pressure by a controllable-pressure valve body.

The cushioning member displaced in response to reciprocating movement of the piston and the piston rod opens and closes a passage venting the cushioning chamber to atmosphere.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 4:
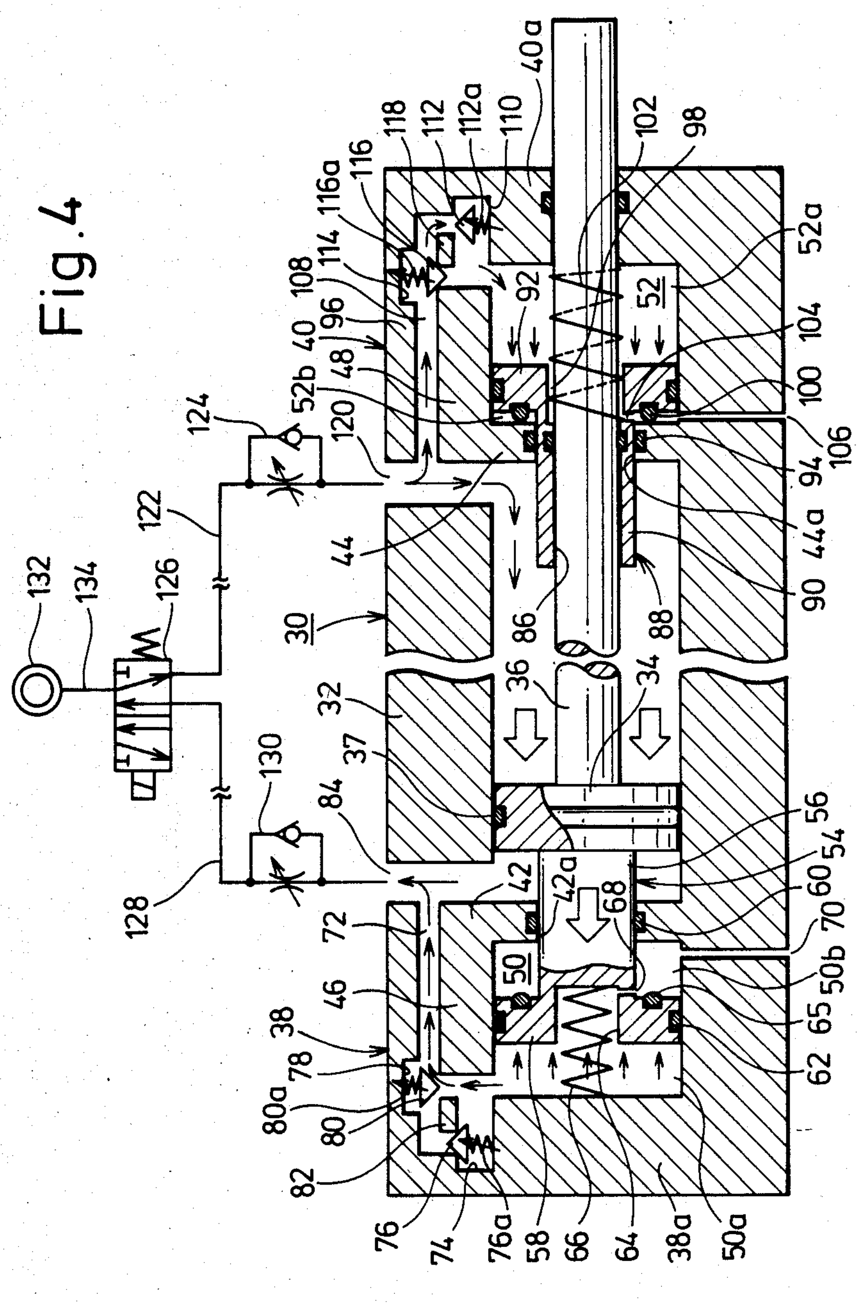
FIG. 4 is a longitudinal cross-sectional view of a pneumatic cylinder having a cushioning mechanism according to the present invention.

As showh in FIG. 4, a pneumatic cylinder 30 according to the present invention generally comprises a cylinder body 32, a piston 34 slidably disposed in the cylinder body 32, and a piston rod 36 having an end attached to the piston 34 with a seal ring 37 fitted in a groove defined in a peripheral surface of the piston 34. A head cover 38 is mounted on an end of the cylinder body 32, and a rod cover 40 on the other end thereof. The cylinder body 32 includes a first wall 42 in one end thereof and a second wall 44 in the other end. The first wall 42 has an end 46 extending axially into the head cover 38, and the second wall 44 has an end 48 extending axially into the rod cover 40. The head cover 38 has an inner space surrounding the first wall 42, and the rod cover 40 has an inner space surrounding the second wall 44. There are a first chamber 50 defined between the first wall 42 and an end wall 38*a* of the head cover 38, and a second chamber 52 defined between the second wall 44 and an end wall 40*a* of the rod cover 40.

The first wall 42 has a central hole 42*a* defined axially therethrough. A first cushioning member 54 is axially slidably disposed in and extends through the hole 42*a*. The first cushioning member 54 is composed of a shaft 56 and a disk 58 integrally formed on one end of the shaft 56. A seal member 60 is fitted in an inner peripheral wall of the first wall 42 in slidable contact with the peripheral surface of the shaft 56. A seal member 62 is fitted in a peripheral surface of the disk 58 in slidable contact with an inner wall of the end 46 and an inner peripheral wall of the head cover 38. The disk 58 has a central circular recess 64 in which there is disposed a first coil spring 66 having an end held against the end wall 38*a*. Therefore, the first cushioning chamber 50 is divided by the disk 58 into a chamber 50*a* defined between the head cover 38 and the disk 58 and a chamber 50*b* defined between the disk 58 and the first wall 42.

A resilient ring 65 is disposed in a side wall of the disk 58 facing the chamber 50b. A passage 68 is defined between the shaft 56 and the disk 58 to provide fluid communication between the chambers 50*a*, 50*b*. The passage 68 is vented to atmosphere through a passage 70 defined between the end of the cylinder body 32 and the head cover 38 when the first cushioning member 54 is in a prescribed position.

A bent passage 72 is defined between the end 46 of the first wall 42 and an inner wall of the head cover 38 and communicates with the first cushioning chamber 50. The head cover 38 has a recess 74 in which is mounted a first valve body 76 (differential pressure valve) having a pressure control means 76*a*. The head cover 38 also has a recess 78 in which a second valve body 80 (relief valve) with a pressure control means 80*a* is adjustably mounted. The first valve body 76 and the second valve body 80 are oriented in opposite directions toward a projection 82 formed in the head cover 38 and can be seated on the projection 82. An inlet/outlet port 84 is defined between the head cover 38 and the cylinder body 32.

The rod cover 40 is constructed in the same manner as the head cover 38. More specifically, the second wall 44 has a central hole 44*a* through which a second cushioning member 88 slidably extends. The second cushioning member 88 includes a cylindrical body 90 and a disk 92 mounted on pne end of the cylindrical body 90 in the second cushioning chamber 52. The piston rod 36 extends through a central bore 86 in the cylindrical body 90 and has an end extending through the end wall 40*a* of the rod cover 40 and exposed to the exterior. A seal member 94 is fitted in an inner peripheral wall of the wall 44 in slidable contact with the peripheral wall of the cylindrical body 90. A seal member 96 is disposed in an annular groove defined in a outer peripheral wall of the disk 92 in slidable contact with an inner wall of the end 48 and an inner peripheral wall of the rod cover 40 for air-tight sealing. The disk 92 has a central circular recess 98. A resilient ring 100 is mounted on a side wall of the disk 92 facing the wall 44. A second coil spring 102 is disposed around the piston rod 36 and having an end positioned in the central circular recess 98 in the disk 92 and an opposite end held against an inner wall of the rod cover 40. The second cushioning chamber 52 is divided by the second cushioning member 88, that is, the disk 92 more precisely, into chambers 52*a*, 52*b* which are held in mutual communication by a passage 104 defined in the disk 92. The passage 104 is in communication with a passage 106 defined between the cylinder body 32 and the rod cover 40, and hence vented to atmosphere when the second cushioning member 88 is in a prescribed position.

A bent passage 108 is defined between the end 48 and an inner wall of the rod cover 40 and communicates with the second cushioning chamber 52. A third adjustable valve body 112 (differential pressure valve) with a pressure control means 112*a* is mounted in a recess 110 defined in the rod cover 40, and a fourth valve body 116 (relief valve) with a pressure control means 116*a* is mounted in a recess 114 defined in the rod cover 40. The third valve body 112 and the fourth valve body 114 can be seated in opposite directions on valve seats provided by a projection 118 formed in the passage 108. Between the cylinder body 32 and the rod cover 40, there is defined a second inlet/outlet port 120 connected to a solenoid-operated directional control valve 126 through a line 122 and a flow control restrictor 124 therein.

The inlet/outlet port 84 is also connected to the solenoid-operated directional control valve 126 through a line 128 and a flow control restrictor 180 therein. The solenoid-operated directional control valve 126 is connected to an air supply 132 via a line 134.

The pneumatic cylinder with the cushioning mechanism according to the present invention is essentially constructed as described above, and operation thereof in respect of a cushioning method will be described hereinbelow.

Figure 5:
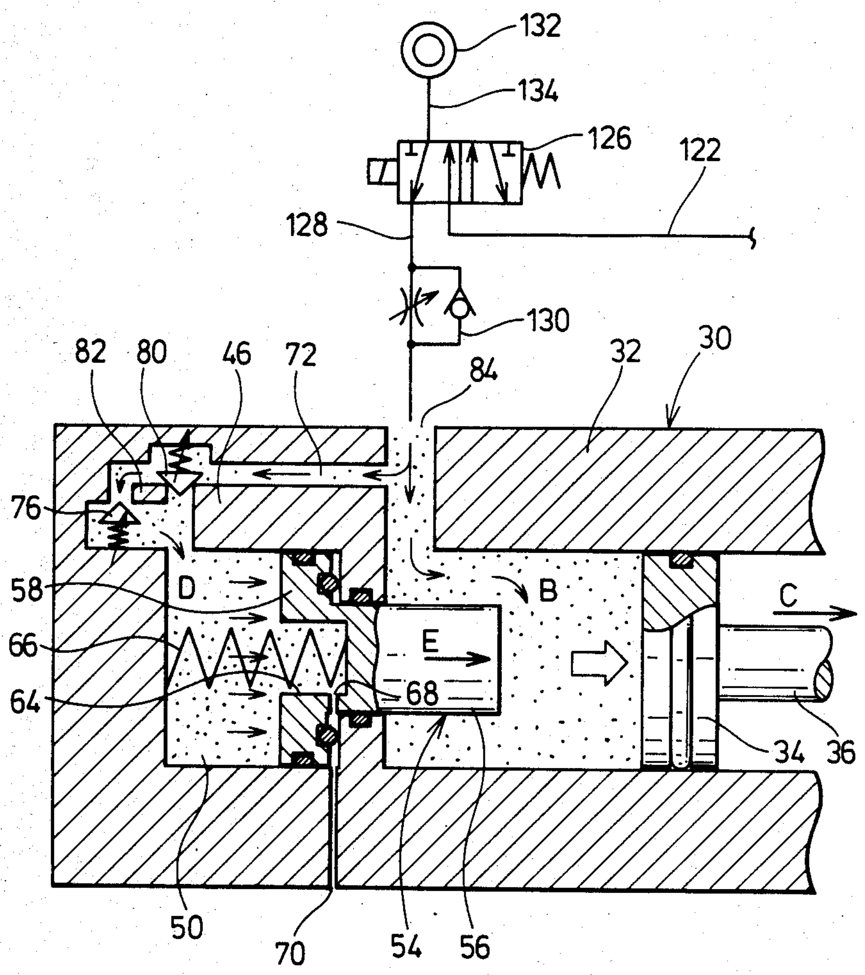
FIGS. 5 through 7 are fragmentary cross-sectional views showing the cushioning mechanism in a head cover and the manner in which a piston operates.
Figure 6:
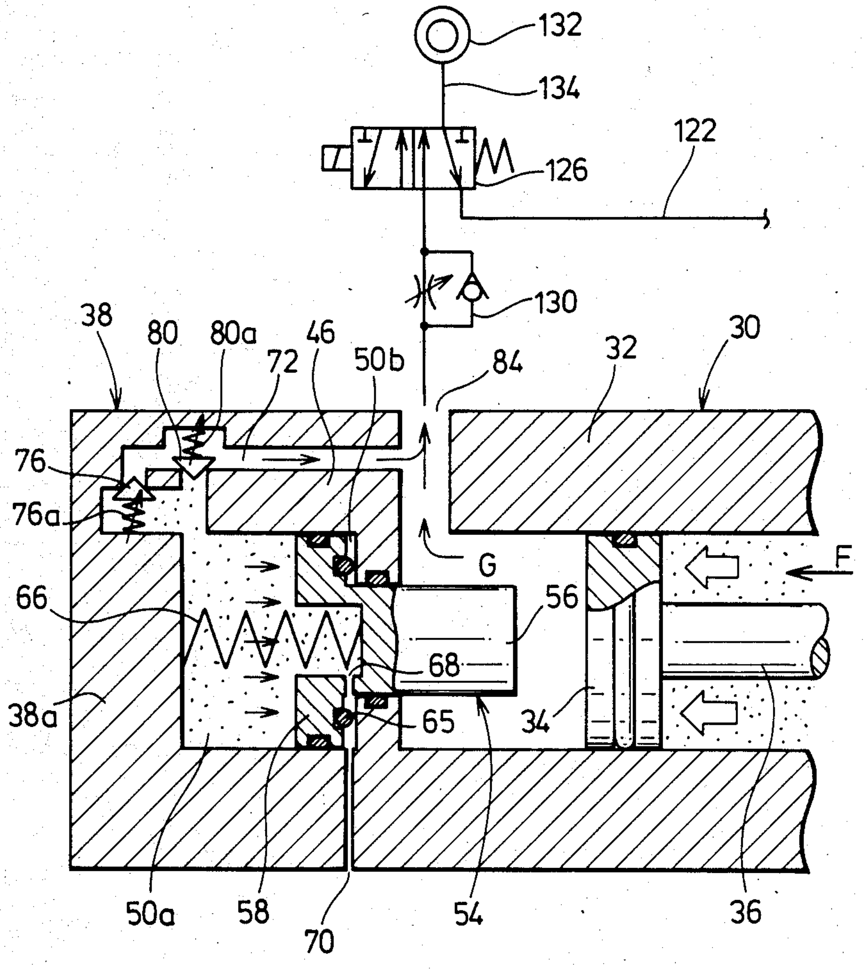

Operation of the cushioning mechanism in the head cover 38 will be described with reference to FIGS. 5 through 7.

Air under pressure supplied from the air supply 132 is introduced through the line 134 into the solenoid-operated directional control valve 126. When the solenoid-operated directional control valve 126 is actuated to supply air under pressure into the line 128, air is delivered through the flow control restrictor 130 to the inlet/outlet port 84, from which air is introduced into the cylinder body 32 as indicated by the arrow B to displace the piston 34 in the direction of the arrow C under the air pressure.

Air flowing in from the inlet/outlet port 84 is branched into an air flow which passes through the passage 72 into the first cushioning chamber 50 as indicated by the arrow D. At this time, the second valve body 80 is seated on a valve seat provided by the projection 82 and the end 46, while the first valve body 76 is unseated off the projection 82 under the supplied air pressure The first valve body 76 thus allows air to be supplied into the first cushioning chamber 50 under the pressure set by the pressure control means **76*a*. The air under pressure having entered the first cushioning chamber 50 pushes the disk 58 so that the first cushioning member 54 is displaced as a whole toward the piston 34 in the direction of the arrow E. A portion of the air under pressure flows through the passage 68 into the chamber 50*b* at this time. Since the chamber 50*b* is vented to atmosphere through the passage 70, the air under pressure having entered the chamber 50*b* is partly discharged out of the passage 70**.

When the first cushioning member 54 is displaced until the resilient ring 65 is pressed against the side of the first wall 42, the resilient ring 65 blocks communication between the passage 68 and the passage 70, and the air under pressure introduced via the line 128 is entrapped in the chamber **50*a*. During this time, the piston rod 36 is displaced in the direction of the arrow C in unison with the piston 34 until finally the piston 34 is brought into abutment against the second cushioning member 88. When the air pressure in the second cushioning chamber is increased by the disk 92 to a degree higher than a pressure set by the relief valve 116, the air is discharged out from the cushioning chamber 52 through the passage 108 and the inlet/outlet port 120. Operation of the cushioning mechanism in the rod cover 40 is substantially the same as the following operation of the cushioning mechanism in the head cover 38, and hence only the operation of the cushioning mechanism in the head cover 38** will be described in detail.

When the solenoid-operated directional control valve 26 is shifted for moving the piston 34 in a next step, air under pressure supplied from the air supply 132 through the line 134 is delivered through the line 122 and the flow control restrictor 124 to the inlet/outlet port 120. While part of the air from the inlet/outlet port 120 is branched into an air flow into the passage 108, most of the air is introduced into the cylinder body 32 to displace the piston 34 and the piston rod 36 in the direction of the arrow F as shown in FIG. 6.

Therefore, the fluid under pressure which has pressed the piston 34 is then discharged out of the inlet/outlet port 84 in the direction of the arrow G, during which time the fluid under pressure in the passage 72 partly flows out of the inlet/outlet port 84 which is open. However, the fluid under pressure entrapped in the first cushioning chamber 50 is prevented from flowing out. More specifically, the first valve body 76 is forcibly seated on a valve seat provided by the projection 82 and an inner wall of the head cover 38 under the pressure of sufficiently compressed air in the first cushioning chamber 50. The second valve body 80 which is preset by the pressure control means **80*a* to operate under a pressure higher than the supplied air pressure is seated on its valve seat by the pressure control means 80*a*. Since the first cushioning member 54 holds the resilient ring 65 pressed against the first wall 42, the passage 68 is prevented by the resilient ring 65 from communicating with the passage 70. As a consequence, the air under pressure within the first cushioning chamber 50 does not find its way out of the first cushioning chamber 50**.

Figure 7:
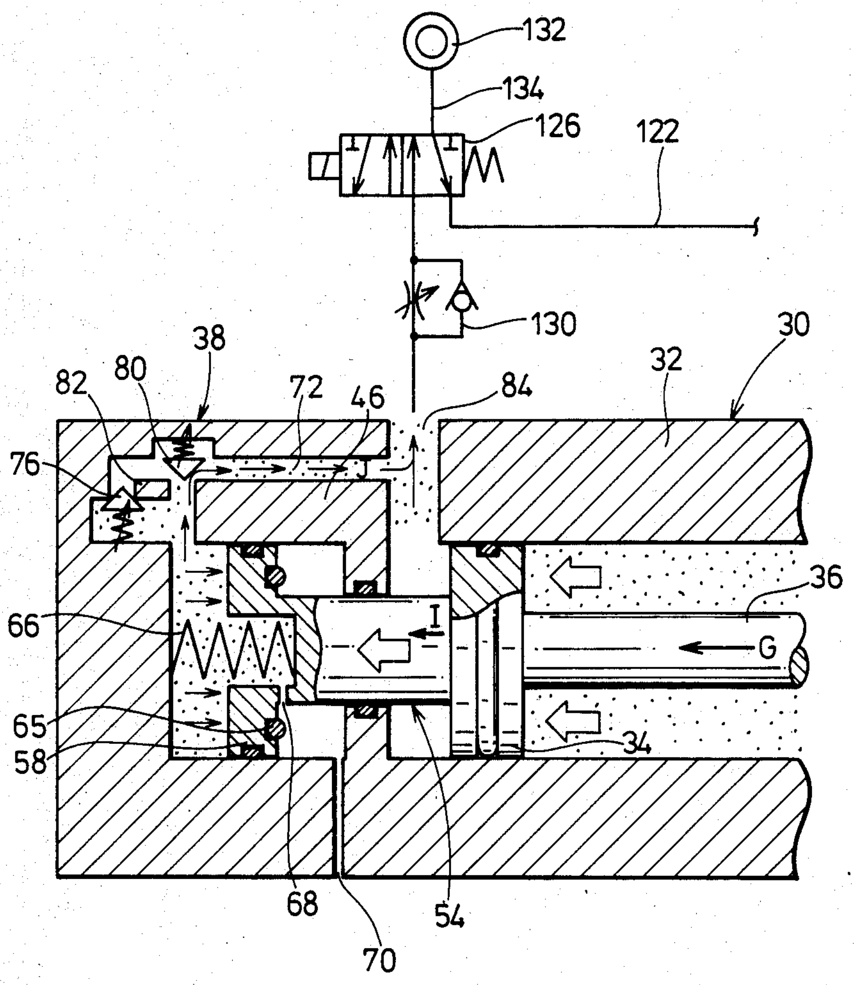

Then, the piston 34 and the piston rod 36 are further displaced in the direction of the arrow G as shown in FIG. 7 until the piston 34 engages and displaces the first cushioning member 54 in the direction of the arrow I. As a result, the resilient ring 65 is disengaged from the the first wall 42 to permit communication between the passages 68, 70. The air under pressure in the first cushioning chamber 50 is now allowed to partly egress through the passage 70. At the same time, however, the air pressure in the chamber **50*a* is substantially increased to a large extent by the displacement of the first cushioning member 54 in the direction of the arrow I. When the air pressure buildup in the chamber 50*a* exceeds the pressure setting of the second valve body 80, the air under pressure causes the second valve body 80 to be unseated from the valve seat, thus letting the pressurized air flow in the direction of the arrow J. The air under pressure from the passage 72 is then discharged out of the inlet/outlet port 84. The first cushioning member 54 is continuously displaced in the direction of the arrow I by the piston 34 against the resilient force of the coil spring 66. When the first cushioning member 54 reaches a prescribed position, the first cushioning chamber 50 is finally kept under atmospheric pressure since the chambers 50*a*, 50*b* communicate with each other through the passage 68, and the passage 70** is vented to atmosphere.

Stated otherwise, the first cushioning member 54 is pushed by the piston 34 to increase the air pressure entrapped in the first cushioning chamber 50, and as soon as the displacement of the piston 34 reaches a predetermined range, the pressurized air is discharged out of the inlet/outlet port 84 while the air pressure is being regulated by the pressure control means **80*a* of the second valve body 80. During this process, the kinetic energy of the piston 34 is smoothly reduced. Inasmuch as the cushioning member 54 is displaced while discharging the air through the passages 68, 70, and the compressed air is quickly discharged under the relief action of the second valve body 80, the first cushioning member 54 is prevented from bounding and hitting the piston 34 with an impact. At a stroke end of the piston 34, the kinetic energy thereof can be reduced sumbstantially to zero. The cushioning mechanism can provide various cushioning capabilities meeting different speeds of reciprocating movement of the piston 34 by adjusting the pressure control means 76***a*, 80*a* of the first and second valve bodies 76, 80 commensurate with such speeds of operation of the piston 34.

Figure 1:
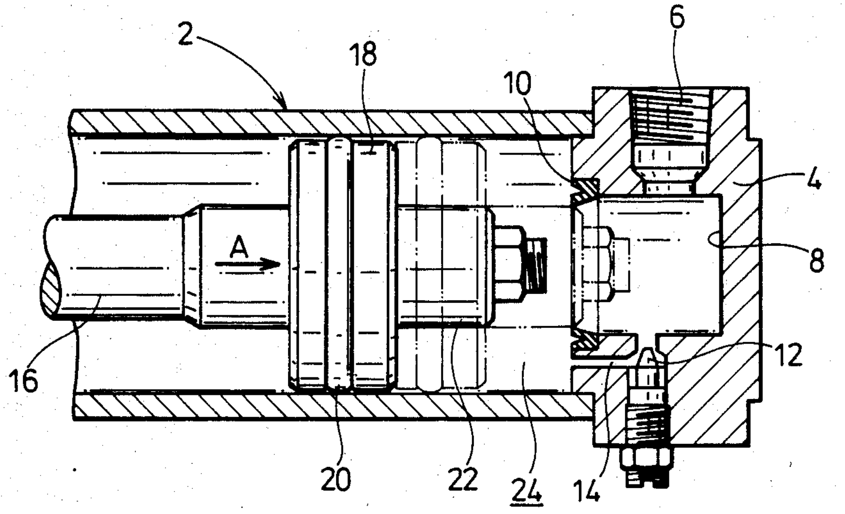
Fig. 1 PRIOR ART
FIG. 1 is a fragmentary longitudinal cross-sectional view of a conventional cushioning mechanism in a pneumatic cylinder.
Figure 2:
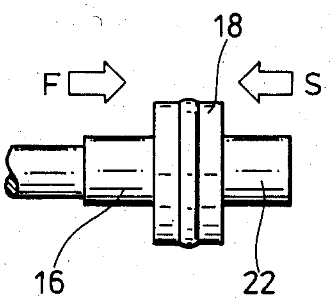
Fig. 2 PRIOR ART
FIG. 2 is a schematic view illustrative of the relationship between a force for driving a piston and a braking force produced by a cushioning mechanism in a meter-out system.
Figure 3:
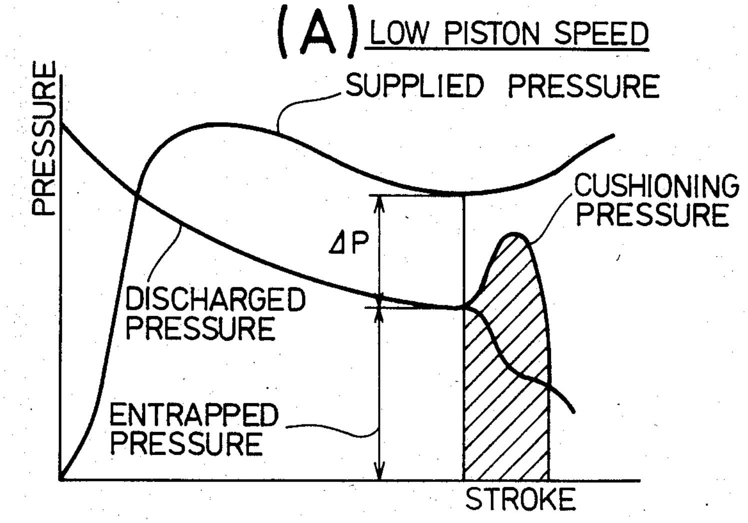
Fig.3 PRIOR ART
FIGS. 3(A) and 3(B) are graphs showing the prior art relationship between the piston stroke and the air pressures in a system wherein the pressure of discharged air is utilized for the cushioning mechanism to produce a cushioning action, FIG. 3(A) being indicative of a lower piston speed, and FIG. 3(A) of a higher piston speed.
Figure 3:
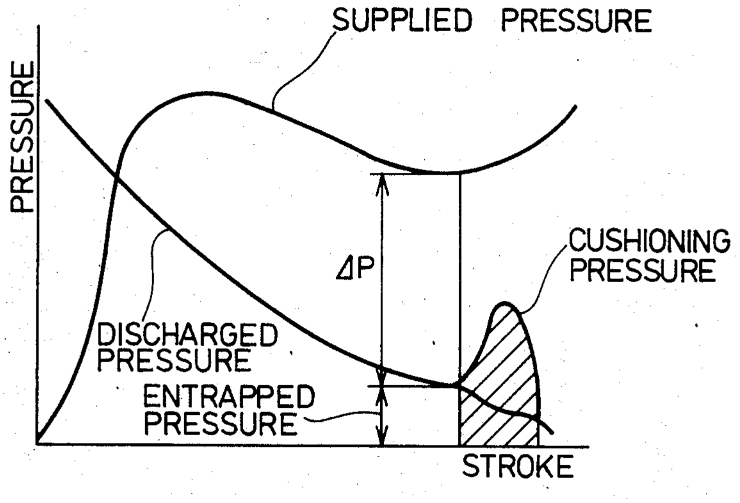
Fig.3 PRIOR ART
Figure 8:
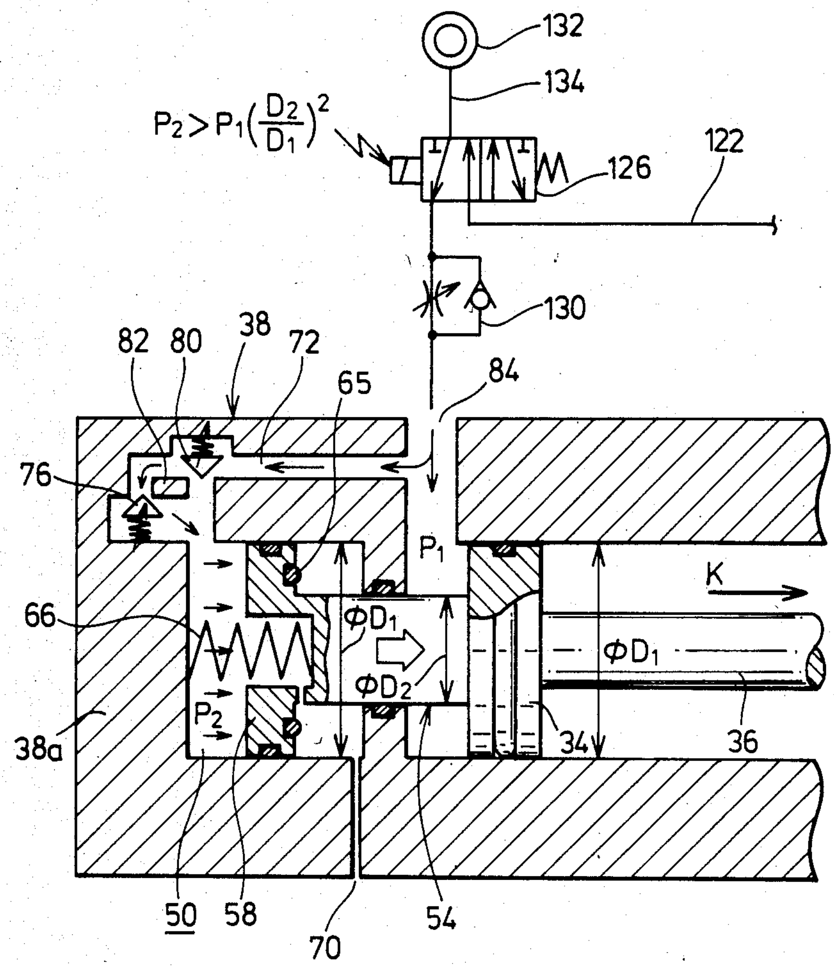
FIG. 8 is a fragmentary cross-sectional view illustrating a double-piston cylinder in which a cushioning member abuts against and pushes the piston.
Figure 9:
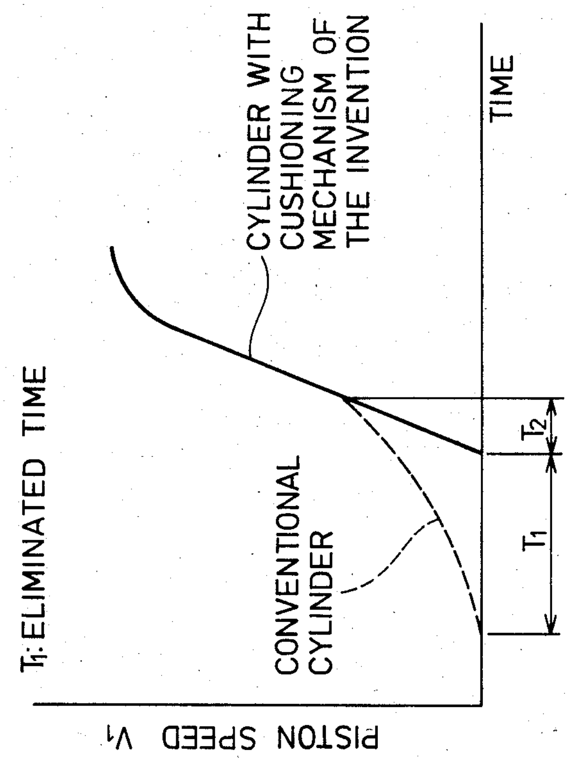
FIG. 9 is a graph showing, for comparison, of the piston speed and time with a conventional pneumatic cylinder and a pneumatic cylinder of the present invention, at the time of starting the operation of the cylinders.

After completion of the operation shown in FIG. 7, the solenoid-operated directional control valve 126 is energized again to introduce air under pressure from the air supply 132 through the line 128 and the flow control restrictor 130 into the inlet/outlet port 84. The air under pressure then shifts the piston 34 again in the direction of the arrow C as shown in FIG. 5. At this time, a branched air flow under pressure is delivered through the passage 72 and the first valve body 76 into the first cushioning chamber 50. Consequently, the first cushioning member 54 is displaced in the direction of the arrow E to the position of FIG. 5 under the air pressure and the resilient force of the coil spring 66. In this returning stroke, the first cushioning member 54 engages the piston 34 and they are displaced together in the direction of the arrow K (FIG. 8) until the resilient ring 65 reaches the first wall 42 or during a cushioning stroke. Thus, the first cushioning member 54 and the piston 34 jointly provide a double-piston cylinder. It is now assumed in FIG. 8 that the cylinder body 32 has an inside cross-sectional area $\phi D_1$, the first cushioning chamber 50 also has an inside cross-sectional area $\phi D_1$, the first cushioning member 54 has a cross-sectional area $\phi D_2$, the piston 34 is subjected to a fluid pressure $P_1$ applied thereto, and the disk 58 of the first cushioning member 54 is subjected to a fluid pressure $P_2$ applied thereto. When the piston 34 and the cushioning member 54 are displaced in unison, the cross-sectional area of the piston 34 on which the fluid pressure $P_1$ is impressed is equal to the cross-sectional area $\phi D_1$ minus the cross-sectional area $\phi D_2$ of the cushioning member 54 held thereagainst. However, since the disk 58 with its cross-sectional area being $\phi D_1$ is simultaneously subjected to the pressure $P_2$ as controlled by the pressure control means 76*a* of the first valve body 76, the piston 34 will produce a greater output than when only the pressure $P_1$ is applied to the piston 34 of the cross-sectional area $\phi D_1$, provided $P_2$ is larger than $P_1(D_2/D_1)^2$. The cushioning mechanism of the present invention can therefore generate a booster effect for producing a greater output at the time of starting as compared with the conventional single-piston cylinder as shown in FIG. 1. It is possible with the arrangement of the invention to prevent the piston 34 from starting with a delay. This booster mode will be described in greater detail with reference to FIG. 9. As illustrated in FIG. 9, it will take a time $(T_1+T_2)$ for the conventional cylinder to reach a piston speed $V_1$ as indicated by the broken line. However, the cylinder with the cushioning mechanism of the invention will only take a time $T_2$ before the piston reaches the speed $V_1$. Accordingly, the cylinder of the invention can reduce the time required to reach the piston speed $V_1$ by at least $T_1$ as compared with the conventional cylinder when starting the cylinder.

With the arrangement of the invention, as described above, the cushioning mechanism produces a cushioning pressure for achieving a desired dampening capability based on supplied air which generally has a higher pressure level than the discharged air pressure, rather than on the discharged air pressure. The dampening capability is available in a wide range since desired cushioning pressures can be selected through adjustment of the pressure control means 76*a* of the differential pressure valve 76 for supplied air. For this reason, the cushioning mechanism of the invention is advantageous in that the dampening capability can more easily be established to cope with the kinetic energy of the piston as it reciprocably moves.

Figure 10:
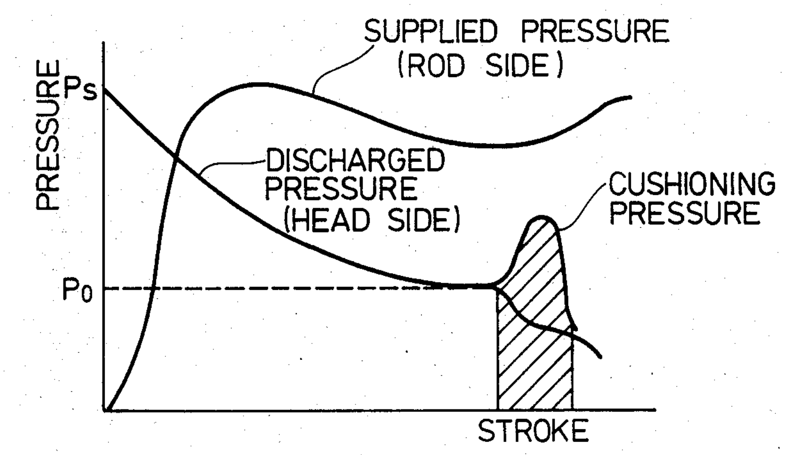
FIG. 10 is a graph showing the relationship between the pressure and piston stroke with a conventional cushioning mechanism.

According to the conventional cushioning mechanism, as illustrated in FIG. 10, the cushioning pressure is derived from the discharged air pressure, and even if the maximum discharged air pressure $P_S$ is quite high, the time when the cushioning pressure is generated is governed by the piston stroke, with the cushioning pressure starting to rise at $P_0$.

Figure 11:
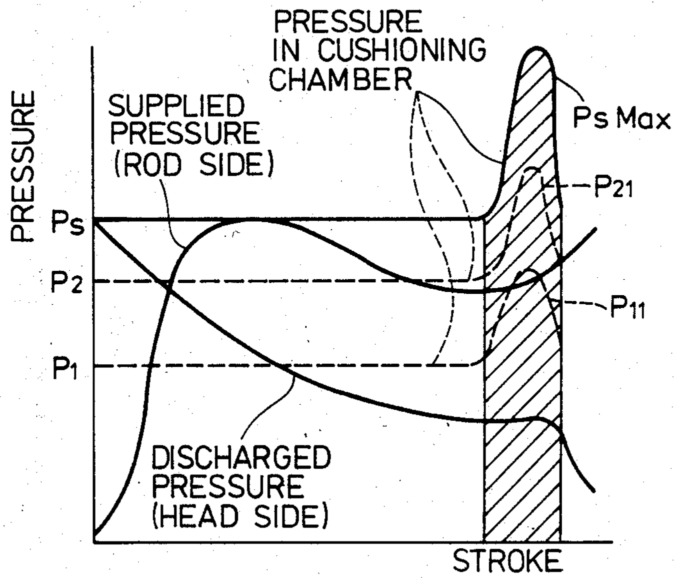
FIG. 11 is a graph showing the relationship between selected supplied air pressures and corresponding cushioning pressures with the cushioning mechanism of the invention in which the supplied air pressure is used for cushioning the piston.

With the present invention, however, as shown in FIG. 11, even if the discharged air pressure varies at a constant rate, a cushioning pressure $P_{11}$ can be produced by selecting a supplied air pressure $P_1$, a cushioning pressure $P_{21}$ can be produced by selecting a supplied air pressure $P_2$, and a cushioning pressure $P_{SMax}$ can be produced by selecting a highest supplied air pressure $P_S$. Thus, a wide range of cushioning pressures is available. Since the source of cushioning forces is the supplied air pressure instead of the discharged air pressure, a considerably wide range of operating speeds of the piston can be met by a high cushioning pressure level commensurate with the reciprocating movement of the piston while the mechanical elements of the cushioning mechanism are kept to given sizes. It has been the conventional practice to customarize cushioning mechanisms to meet different piston driving requirements. The cushioning mechanism of the invention, however, is versatile in applications, and can be designed for compact size and mass production.

Figure 12:
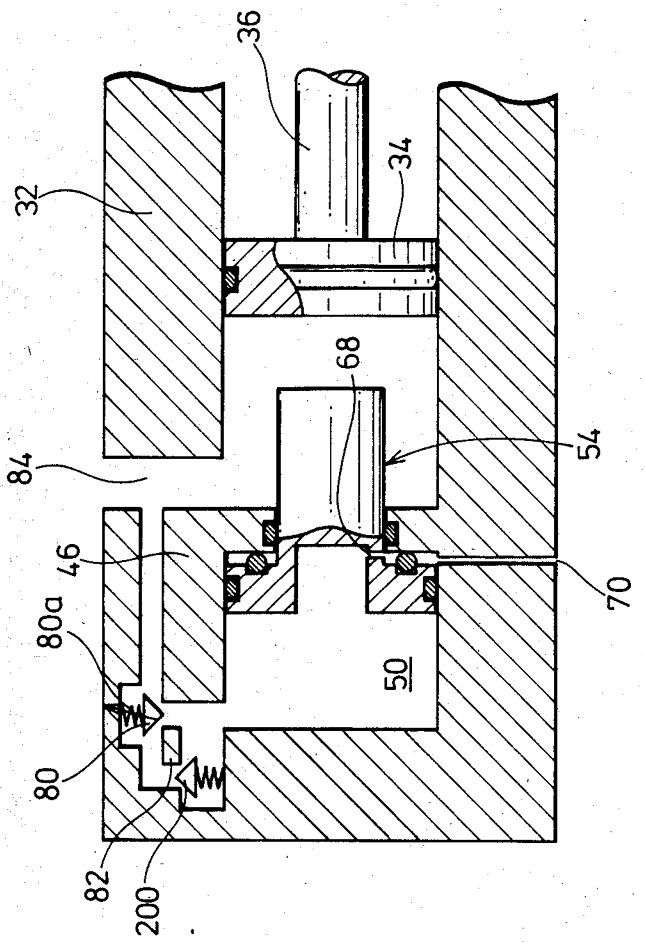
FIGS. 12 and 13 are fragmentary cross-sectional views of pneumatic cylinders with cushioning mechanisms according to other embodiments of the present invention.

FIG. 12 is illustrative of a cushioning mechanism according to another embodiment of the present invention. Like or corresponding parts in FIG. 12 are denoted by like or corresponding reference characters used for the preceding embodiment.

The first valve body 76 in the foregoing embodiment is replaced with a check valve 200 having no pressure control means and hence no differential pressure valve capability, and the third valve body 112 in the foregoing embodiment is also replaced with a check valve having no pressure control means and hence no differential pressure valve capability.

With this construction, since air under pressure is introduced into the cushioning chambers 50*a*, 52*a* (FIG. 4) through the check valves, any pressure drop across the check valves is fixed and small. Therefore, the cushioning members 54, 88 can be moved back to the position of FIG. 5 under the pressure of supplied air only, with the result that the coil springs 66, 102 (FIG. 4) are dispensed with. Pressure control being effected by the pressure control means 80*a*, 116*a* of the relief valves 80, 116, the pneumatic cylinder of FIG. 12 can be used in limited applications in which the cylinder is operated in a certain range of high speeds. In addition, the cushioning mechanism is much simpler and can be manufactured at a reduced cost, and pressure control can be simplified.

Figure 13:
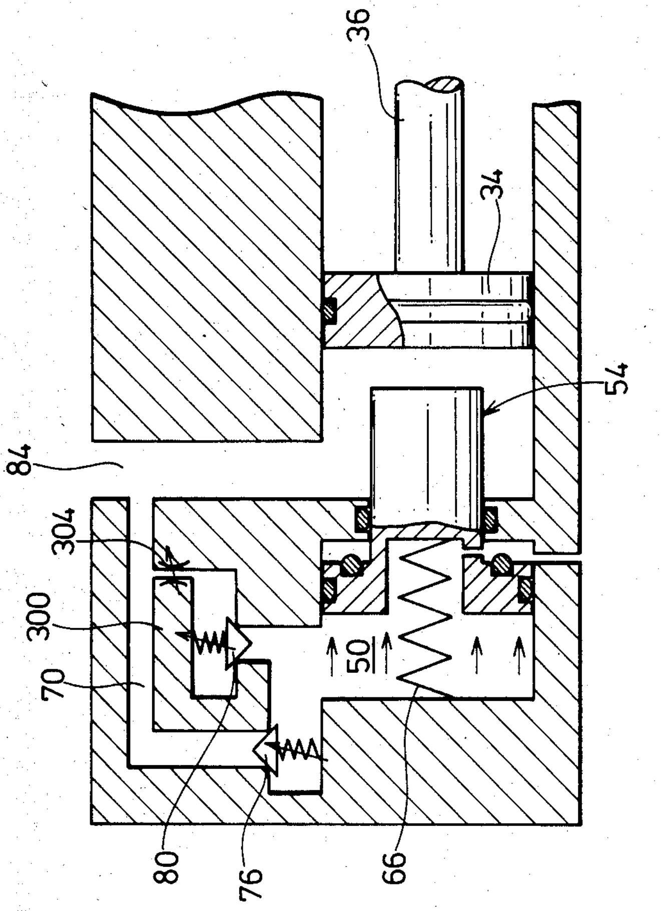

FIG. 13 shows a cushioning mechanism according to still another embodiment of the present invention. Like or corresponding parts in FIG. 13 are denoted by like or corresponding reference characters used for the preceding embodiments.

The projection 82 in the previous embodiments is replaced with a bent projection 300 provided between the passage 72 and the chamber 50, and the second valve body 80 is disposed between a bent portion of the bent projection 300 and the end 46. A flow control restrictor valve 304 is also disposed between the projection 300 and the end 46. The rod cover 40 is of the same construction.

The arrangement of FIG. 13 is effective in producing cushioning forces in uses in which the piston reciprocably moves at low speeds. More specifically, while the cushioning mechanism of the invention is primarily designed for use under conditions which exceed the dampening capacity of the conventional cushioning mechanism, it is preferable that the cushioning mechanism of the invention be capable of being employed in an operating speed range that can be covered by the conventional cushioning mechanism. In the above embodiments, the relief valve 80 is used for letting the pressurized air be released from the chamber 50. However, the relief capability of the simple flow control restrictor valve 304 will suffice for low kenetic energy of the piston. The flow control restrictor valve 304 can provide a pressure relief action for low kinetic energy of the piston while the relief valve 80 is adjusted to a low pressure setting, and is capable of adjusting the relief action for low kinetic energy.

The double construction of the relief valve 80 and the flow control restrictor valve 304 shown in FIG. 13 can cover both a range covered by the conventional cushioning mechanism and a range exceeding the capacity of the conventional cushioning mechanism and met by the cushioning mechanism of the invention. Therefore, the cushioning mechanism of FIG. 13 can meet a wider range of driving conditions.

Although certain preferred embodiments have been shown and described, it should be understood that many changes and modifications may be made therein without departing from the scope of the appended claims.

What is claimed is:

1. A pneumatic cylinder with a cushioning mechanism, comprising:

(a) a cylinder body having a first cushioning chamber at one end thereof and a second cushioning chamber at an opposite end thereof, said cylinder body having first and second inlet/outlet ports at the ends thereof, respectively, said first inlet/outlet port and said first cushioning chamber communicating with each other through a first air passage, said second inlet/outlet port and said second cushioning chamber communicating with each other through a second air passage:

(b) a piston slidably movable in said cylinder body;

(c) a first cushioning member displaceably mounted in said first cushioning chamber and extending toward said piston for being pushed thereby;

(d) a second cushioning member displaceably mounted in said second cushioning chamber and extending toward said piston for being pushed thereby;

(e) an air supply connected to said first and second inlet/outlet ports through a common directional control valve;

(f) a first valve body disposed in said first air passage for adjusting an air pressure from said air supply and supplying the adjusted air pressure into said first cushioning chamber to displace said first cushioning member;

(g) a second valve body disposed in said first air passage for discharging compressed air from said first cushioning chamber to said first inlet/outlet port when the pressure of air compressed in said first cushioning chamber by said first cushioning member displaced by being pushed by said piston exceeds a predetermined level;

(h) a third valve body disposed in said second air passage for adjusting an air pressure from said air supply and supplying the adjusted air pressure into said second cushioning chamber to displace said second cushioning member;

(i) a fourth valve body disposed in said second air passage for discharging compressed air from said second cushioning chamber to said second inlet/-outlet port when the pressure of air compressed in said second cushioning chamber by said seocnd cushioning member displaced by being pushed by said piston exceeds a predetermined level; and (j) respective disk members integral with said first and second cushioning members, respectively, dividing each of said first and second cushioning chambers into two chambers, each of said disk members having a passage providing communication between said two chambers.

2. A pneumatic cylinder according to claim 1, including a piston rod having an end attached to said piston, said first cushioning member comprising a shaft for engaging one end face of said piston and a disk movable in unison with said shaft within said first cushioning chamber, said first cushioning member being normally pressed toward said piston by pressing member disposed in said first cushioning chamber, said second cushioning member comprising a cylindrical body for engaging an opposite end face of said piston with said piston rod extending through said cylindrical body and a disk movable in unison with said cylindrical body within said second cushioning chamber, said second cushioning member being normally pressed toward said piston by a pressing member disposed in said second cushioning chamber.

3. A pneumatic cylinder according to claim 2, including a head cover mounted on said one end of said cylinder body, a first wall disposed in said cylinder body and having an end directed toward said head cover, said first cushioning chamber being defined by said head cover, said first wall, and said end of the first wall, a rod cover mounted on said opposite end of said cylinder body, and a second wall disposed in said cylinder body and having an end directed toward said rod cover, said second cushioning member being defined by said rod cover, said second wall, and said end of the second wall.

4. A pneumatic cylinder according to claim 3, wherein said pressing members for pressing said first and second cushioning members comprise coil springs, respectively.

5. A pneumatic cylinder according to claim 1, wherein said first and third valve bodies comprise controllable-pressure differential pressure valves, respectively, said second and fourth valve bodies comprise controllable-pressure relief valves, respectivley.

6. A pneumatic cylinder according to claim 1, wherein said first and third valve bodies comprise check valves, respectively.

7. A pneumatic cylinder according to claim 1, wherein said second and fourth valve bodies comprise restrictor valves, respectively.

8. A pneumatic cylinder according to claim 1, wherein one of said two chambers divided in each of said first and second chambers has a pasage vented to atmosphere.

9. A pneumatic cylinder according to claim 8, including resilient rings mounted respectively on said disks, said resilient rings blocking communication between said passage communicating between said two chambers and said passage vented to atmosphere when said first and second cushioning members are displaced toward said piston.

* * * * *